United States Patent
Nakasu et al.

(10) Patent No.: US 8,902,257 B2
(45) Date of Patent: Dec. 2, 2014

(54) APPARATUS AND METHOD FOR PRODUCING A THUMBNAIL IMAGE INCLUDING A MAGNIFIED CHARACTERISTIC REGION AND ANOTHER DEFORMED REGION AND NON-TRANSITORY COMPUTER-READABLE MEDIUM THEREOF

(75) Inventors: Toshiaki Nakasu, Kanagawa-ken (JP); Norihiro Nakamura, Kanagawa-ken (JP); Isao Mihara, Tokyo (JP); Yasunobu Yamauchi, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 741 days.

(21) Appl. No.: 13/050,443

(22) Filed: Mar. 17, 2011

(65) Prior Publication Data

US 2012/0069040 A1 Mar. 22, 2012

(30) Foreign Application Priority Data

Sep. 16, 2010 (JP) .................. P2010-208556

(51) Int. Cl.
  *G06T 3/40* (2006.01)
  *G06T 3/00* (2006.01)
(52) U.S. Cl.
  CPC .................. *G06T 3/0012* (2013.01)
  USPC ........................ 345/660; 345/472
(58) Field of Classification Search
  CPC ..................................... G06T 3/40
  USPC ........................ 345/660, 646–647
  See application file for complete search history.

(56) References Cited

U.S. PATENT DOCUMENTS

| 2007/0268317 A1* | 11/2007 | Banay ............... 345/660 |
| 2008/0025576 A1* | 1/2008 | Li et al. ............. 382/118 |
| 2008/0088626 A1* | 4/2008 | Habe et al. ......... 345/427 |
| 2008/0112648 A1* | 5/2008 | Hatano ............. 382/298 |
| 2010/0156942 A1* | 6/2010 | Kung et al. ........ 345/661 |
| 2010/0283865 A1* | 11/2010 | Honma ............. 348/222.1 |

FOREIGN PATENT DOCUMENTS

| JP | 3482923 A | 10/2003 |
| JP | 2006-313511 A | 11/2006 |

OTHER PUBLICATIONS

The Journal of the Institute of Image Electronics Engineers of Japan, vol. 35, No. 5, pp. 558-566; Resolution Conversion Using Delaunay Triangulation; N. Nakamura; 2005.
International Journal of Computer Vision, vol. 1, No. 4, pp. 321-331 "Snakes: Active Contour Models", m. Kass et al; 1988.

* cited by examiner

*Primary Examiner* — Ke Xiao
*Assistant Examiner* — Weiming He
(74) *Attorney, Agent, or Firm* — Holtz, Holtz, Goodman & Chick PC

(57) ABSTRACT

An image processing apparatus comprising an input unit which inputs an image, a first region calculating unit which calculates a first region in the image, a second region calculating unit which calculates a second region, which is surrounding the first region in the image and an image deformation unit which magnifies the image included in the first region while deforming an image included in the second region.

19 Claims, 10 Drawing Sheets

APPARATUS AND METHOD FOR PRODUCING A THUMBNAIL IMAGE INCLUDING A MAGNIFIED CHARACTERISTIC REGION AND ANOTHER DEFORMED REGION AND NON-TRANSITORY COMPUTER-READABLE MEDIUM THEREOF

CROSS-REFERENCE TO RELATED APPLICATION

This application is based upon and claims the benefit of priority from Japanese Patent Application No. P2010-208556, filed on Sep. 16, 2010; the entire contents of which are incorporated herein by reference.

FIELD

Embodiments described herein generally relate to an image processing apparatus, method, and program.

BACKGROUND

There is an image processing apparatus that produces a thumbnail image such that a characteristic region that is of a characteristic region of the thumbnail image is magnified while other regions are deformed in producing the thumbnail image of contents such as a photograph and a moving image.

In the image processing apparatus, there is a demand for being able to produce the thumbnail image whose contents are easily recognized by a user.

DETAILED DESCRIPTION

A problem to be solved by the present invention is to provide an image processing apparatus, method, and program, which can produce the thumbnail image whose contents are easily recognized by the user.

In order to solve the above problem, an image processing apparatus includes an input unit, a first region calculating unit, a second region calculating unit and an image deformation unit.

The input unit inputs an image and the first region calculating unit calculates a first region in the image.

The second region calculating unit calculates a second region, which is surrounding the first region in the image.

The image deformation unit magnifies the image included in the first region while deforming an image included in the second region.

(First Embodiment)

An image processing apparatus 1 according to a first embodiment of the present invention processes an input image to produce a thumbnail image. For example, the image processing apparatus 1 is used for an information terminal, such as a PC (personal computer), a mobile phone, and a digital camera, which can display an image.

Figure 1A:
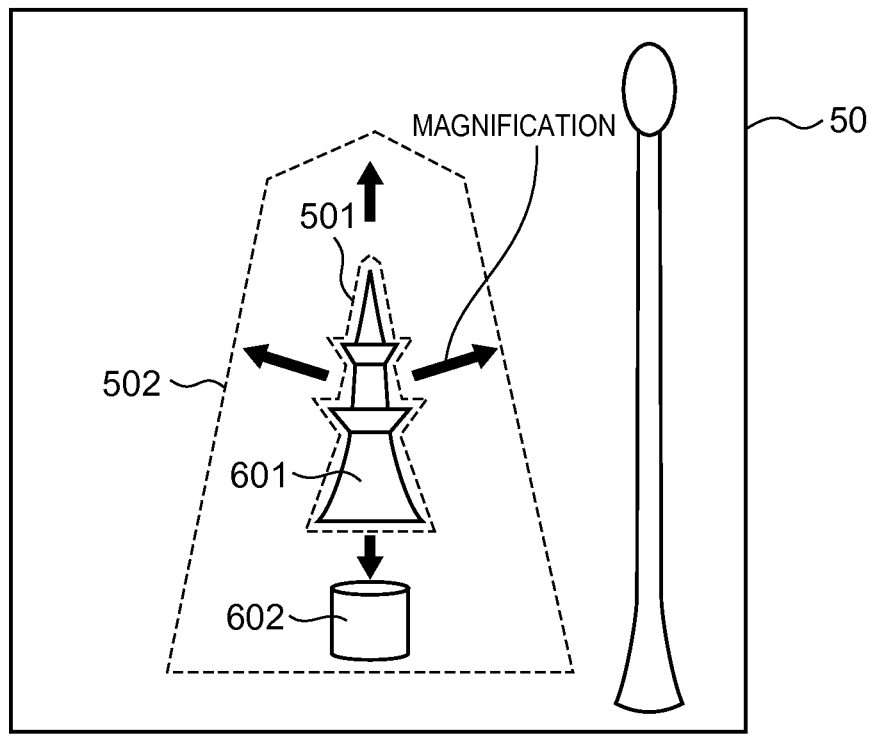
FIG. 1 is an explanatory view illustrating image processing performed by an image processing apparatus 1 according to a first embodiment.

FIG. 1 is an explanatory view illustrating image processing performed by the image processing apparatus 1 which calculates a first region 501. The first region 501 is a region on which a user easily focuses on an input image 50 (to be described later) that is a processing target. The image processing apparatus 1 calculates a second region 502 that surrounds the first region 501. The image processing apparatus 1 magnifies an image included in the first region 501 while deforming an image included in the second region 502. The image processing apparatus 1 magnifies the image, included in the first region 501, in the second region 502. Therefore, the image processing apparatus 1 produces a thumbnail image 60 in which the input image 50 is processed.

Figure 1B:
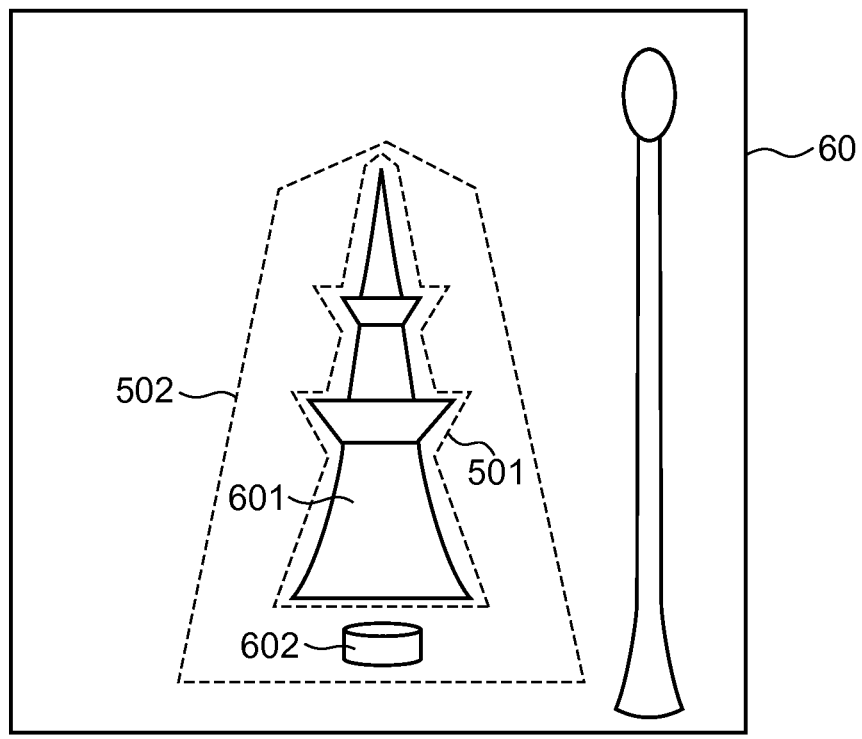

In other words, an image, in which a physical object 601 existing in the first region 501 is magnified while a physical object 602 existing in the second region 502 is compressed in the input image 50 (FIG. 1A), is the thumbnail image 60 (FIG. 1B).

Figure 2:
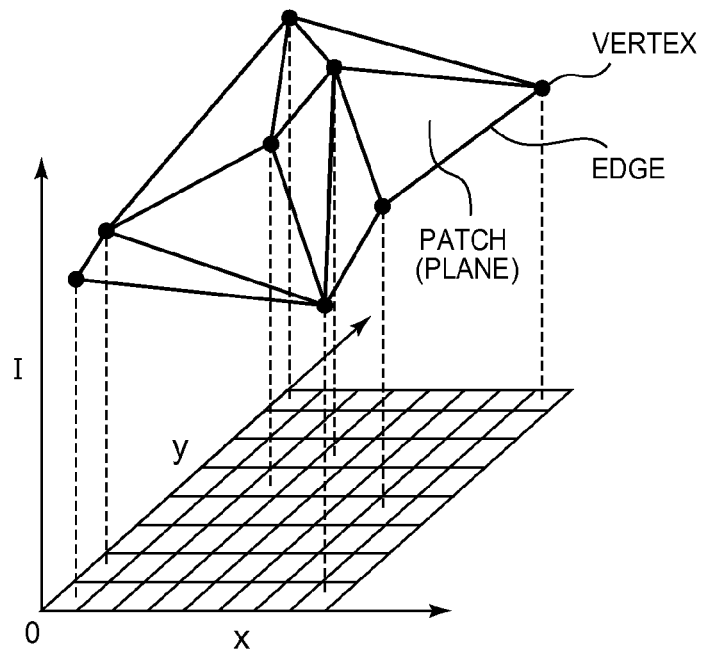
FIG. 2 is an explanatory view illustrating a form of an input image 50 in the first embodiment.
Figure 2:
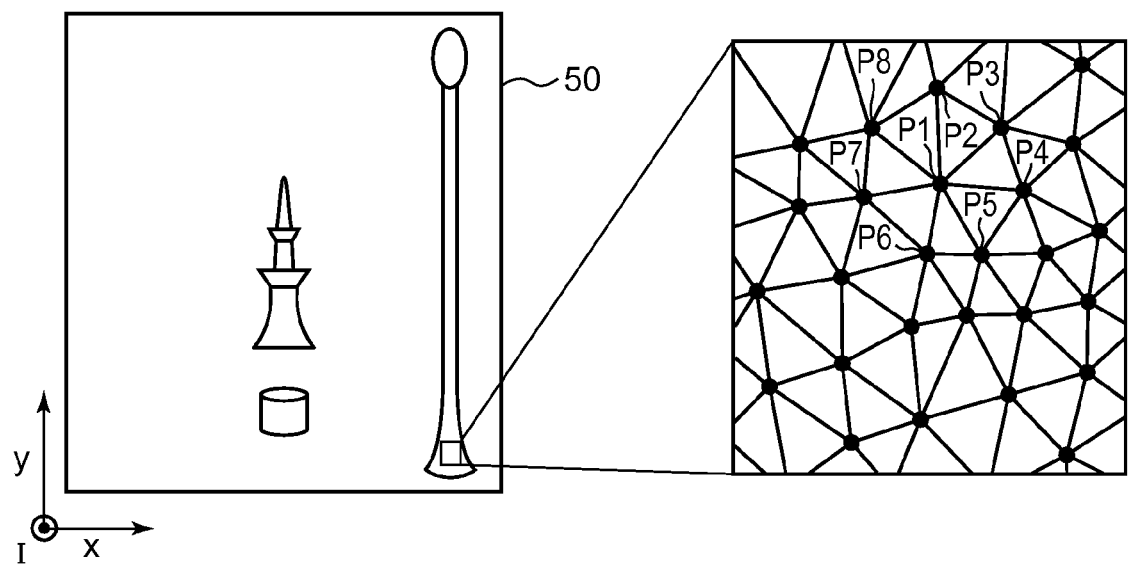

The input image 50 of the first embodiment will be described below. FIG. 2 is a view illustrating the input image 50 of the first embodiment. As illustrated in FIG. 2, the input image 50 is expressed by a mesh including plural patches in a coordinate space that is defined by a position (x, y) and a luminance I.

The mesh may be expressed by coordinate information (x, y, I) of each vertex and connection information (for example, information indicating that "a vertex P1 is connected to vertexes P2 to P8" in the lower right area of FIG. 2) indicating which vertex is connected to a vertex by an edge. The patch means one plane surrounded by the edges that connect the vertexes. In FIG. 2, the patch includes a triangular patch having a triangular shape. Alternatively, the patch may be formed into another shape.

When the input image 50 is a color image, each vertex may include color information (for example, RGB) in addition to the luminance I. A patch ID may be added to each patch in order to identify the patch. A vertex ID may be added to each vertex in the mesh in order to identify the vertex.

Figure 3:
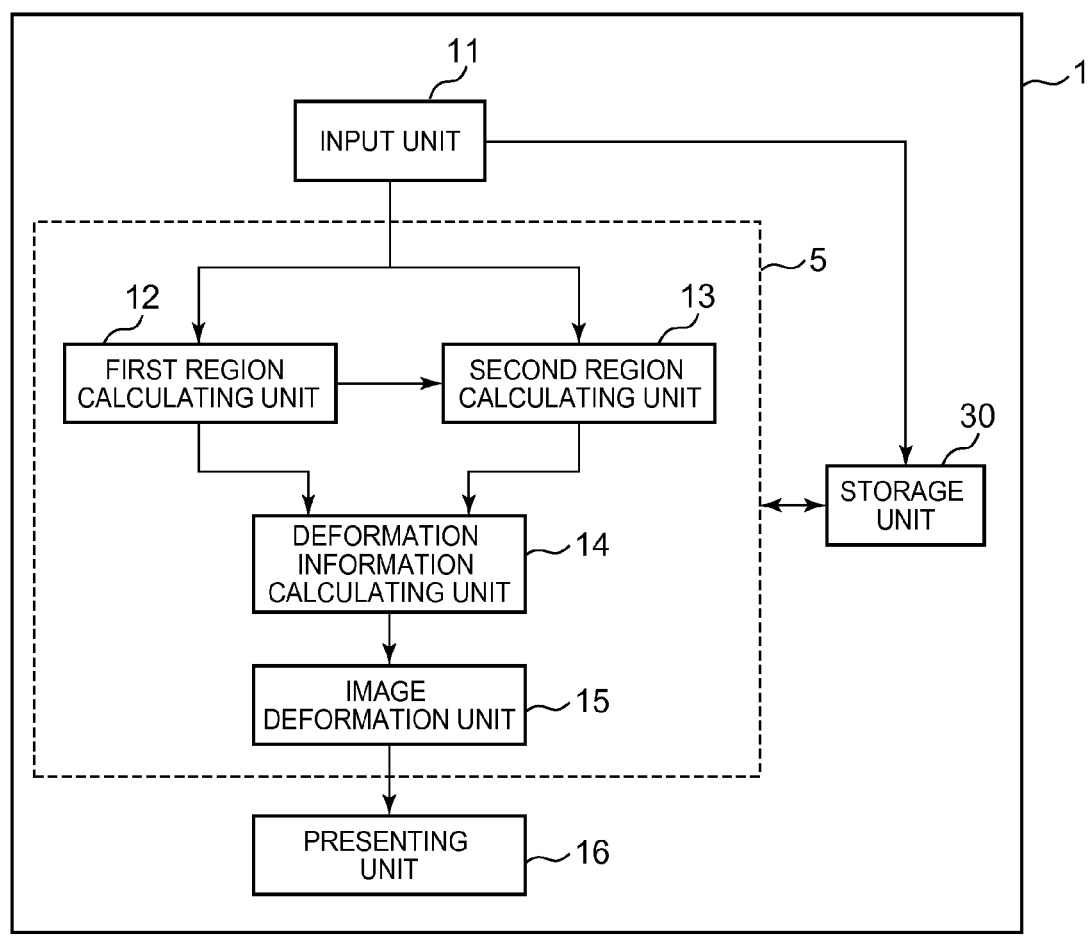
FIG. 3 is a block diagram illustrating a configuration of the image processing apparatus 1 of the first embodiment.

FIG. 3 is a block diagram illustrating a configuration of the image processing apparatus 1. The image processing apparatus 1 includes an input unit 11, a processing unit 5, a presenting unit 16, and a storage unit 30. The processing unit 5 includes a first region calculating unit 12, a second region calculating unit 13, a deformation information calculating unit 14, and an image deformation unit 15.

The input unit 11 inputs the input image 50 that is to be the processing target. The input image 50 may be an image in which an original image such as a JPEG or bitmap image is converted into the mesh by the technique disclosed in "Resolution Conversion Using Delaunay Triangulation" by T. Nakamura, H. Abe, K. Nishio, and K. Kobori, Journal of the Institute of Image Electronics Engineers of Japan, Vol. 35, No. 5, 2005. Contents of which are hereby incorporated by reference.

The first region calculating unit 12 calculates the first region 501 based on a degree of attention expressing intensity of a change in luminance in the input image 50. That is, the degree of attention shows how easily an attention from a user can be attracted. For example, the degree of attention can be obtained based on the intensity of the change in luminance in the input image 50. For example, the technique disclosed in Japanese Patent No. 3482923 may be used. Contents of which are hereby incorporated by reference.

The second region calculating unit 13 calculates the second region 502 that surrounds the first region 501, based on the first region 501.

The deformation information calculating unit 14 calculates a magnifying ratio R and a magnifying center O based on a size and a shape of the first region 501 and a size and a shape of the second region 502. The magnifying ratio R is a ratio that is used to magnify the first region 501, and the magnifying center O is a center in magnifying the first region 501.

Based on the magnifying ratio and the magnifying center, the image deformation unit 15 magnifies the image included in the first region 501 while deforming the image included in the second region 502, whereby the image deformation unit 15 processes the input image 50 to produce the thumbnail image 60. The presenting unit 16 presents the thumbnail image 60.

The processing unit 5 may be implemented by a central processing unit (CPU) and a memory used by the CPU. The storage unit 30 may be implemented by the memory used by the CPU.

Thus, the image processing apparatus 1 has the above-described configuration.

Figure 4:
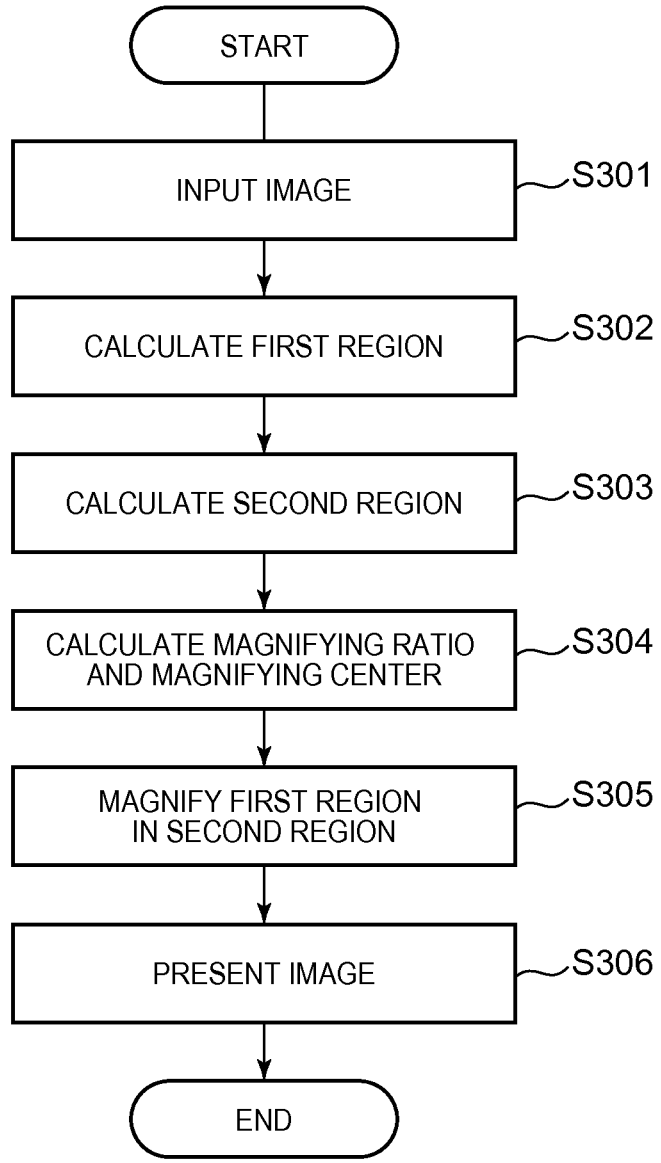
FIG. 4 is a flowchart illustrating processing of the image processing apparatus 1 of the first embodiment.

FIG. 4 is a flowchart illustrating processing of the image processing apparatus 1. The input unit 11 inputs the input image 50 that is to be the processing target (S301). The first region calculating unit 12 calculated the first region 501 in the input image 50 (S302). The second region calculating unit 13 calculates the second region 502 (S303). The deformation information calculating unit 14 calculates the magnifying ratio and the magnifying center based on the size and shape of the first region 501 and the size and shape of the second region 502 (S304).

Based on the magnifying ratio and the magnifying center, the image deformation unit 15 compresses the image included in the second region 502 while magnifying the image included in the first region 501, whereby the image deformation unit 15 deforms the input image 50 to produce the thumbnail image 60 (S305). The presenting unit 16 presents the thumbnail image Thus, the image processing apparatus 1 performs the above-described processing.

Each unit of the image processing apparatus 1 will be described in detail below.

The input unit 11 supplies the input image 50 which has been input to the first region calculating unit 12 and the second region calculating unit 13. The input unit 11 writes the input image 50 in the storage unit 30.

The first region calculating unit 12 calculates the first region 501 based on the degree of attention in the input image 50 supplied from the input unit 11. The first region calculating unit 12 may recognize a region (set of patches), surrounded by coupling the plural (k) vertexes in the mesh, as the first region 501. For example, the first region calculating unit 12 may calculate the degree of attention using the technique disclosed in Japanese Patent No. 3482923. Contents of which are hereby incorporated by reference. The first region calculating unit 12 notifies the second region calculating unit 13 and the deformation information calculating unit 14 of the first region 501. For example, the first region calculating unit 12 may notify the second region calculating unit 13 and the deformation information calculating unit 14 of the patch ID of the patch included in the first region 501.

Figure 5:
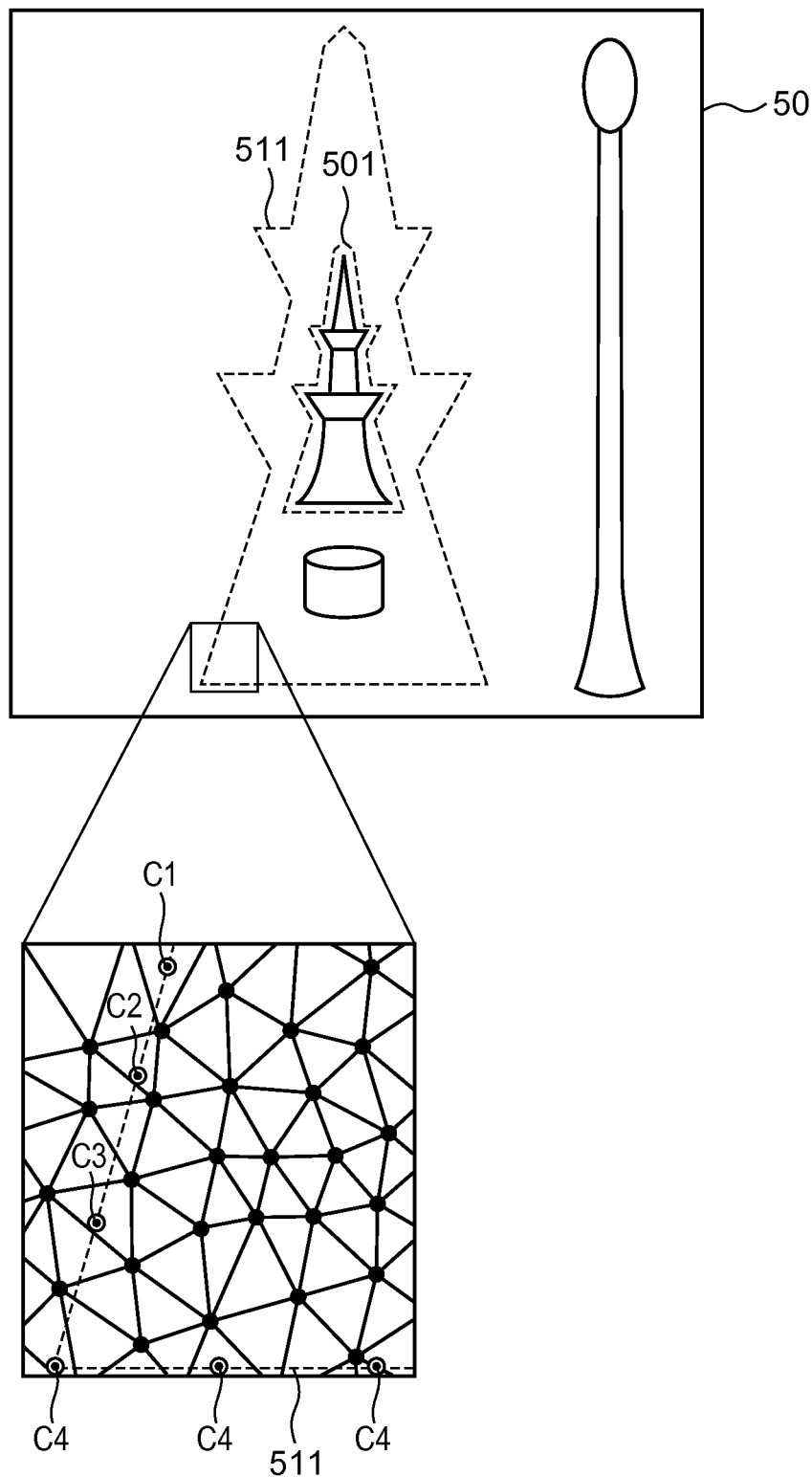
FIG. 5 is a view illustrating processing of a second region calculating unit 13.

The second region calculating unit 13 calculates the second region 502 based on the first region 501. FIG. 5 is a view illustrating processing of the second region calculating unit 13. For example, the second region calculating unit 13 sets a tentative region 511 based on the size of the first region 501. The tentative region 511 is a region (for example, a region magnified around a barycenter of the first region 501) where the first region 501 is magnified by a predetermined magnification rate.

In the tentative region 511, the second region calculating unit 13 sets a vertex corresponding to each vertex included in a contour of the first region 501 to an adjustment point Cn (n=1 to k). At this point, the second region calculating unit 13 sets each adjustment point Cn on the patch plane including an xy-coordinate of the adjustment point Cn.

Based on gradient of the luminances (change in luminance) of the plural patches included in the tentative region 511, the second region calculating unit 13 moves the adjustment point Cn such that the contour of the tentative region 511 is shortened to become a smooth shape, and the second region calculating unit 13 deforms the tentative region 511 to calculate the second region 502. For example, the second region calculating unit 13 may calculate the second region 502 using a dynamic contour model (Snake method) disclosed in "Snakes: Active Contour Models. International Journal of Computer Vision" by M. Kass, A. Witkin, and D. Terzopoulos, Vol. 1, No. 4, pp. 321-331, 1988. Contents of which are hereby incorporated by reference. For example, the second region calculating unit 13 may recognize the tentative region 511 in the state in which the first region 501 is magnified as the second region 502.

The second region calculating unit 13 notifies the deformation information calculating unit 14 of the second region 502. For example, the second region calculating unit 13 may notify the deformation information calculating unit 14 of the patch ID of the patch included in the second region 502.

Based on the first region 501 and the second region 502, the deformation information calculating unit 14 calculates the magnifying center O that becomes the center in magnifying the first region 501 and the magnifying ratio R that is of the magnification at which the first region 501 is magnified.

Figure 6:
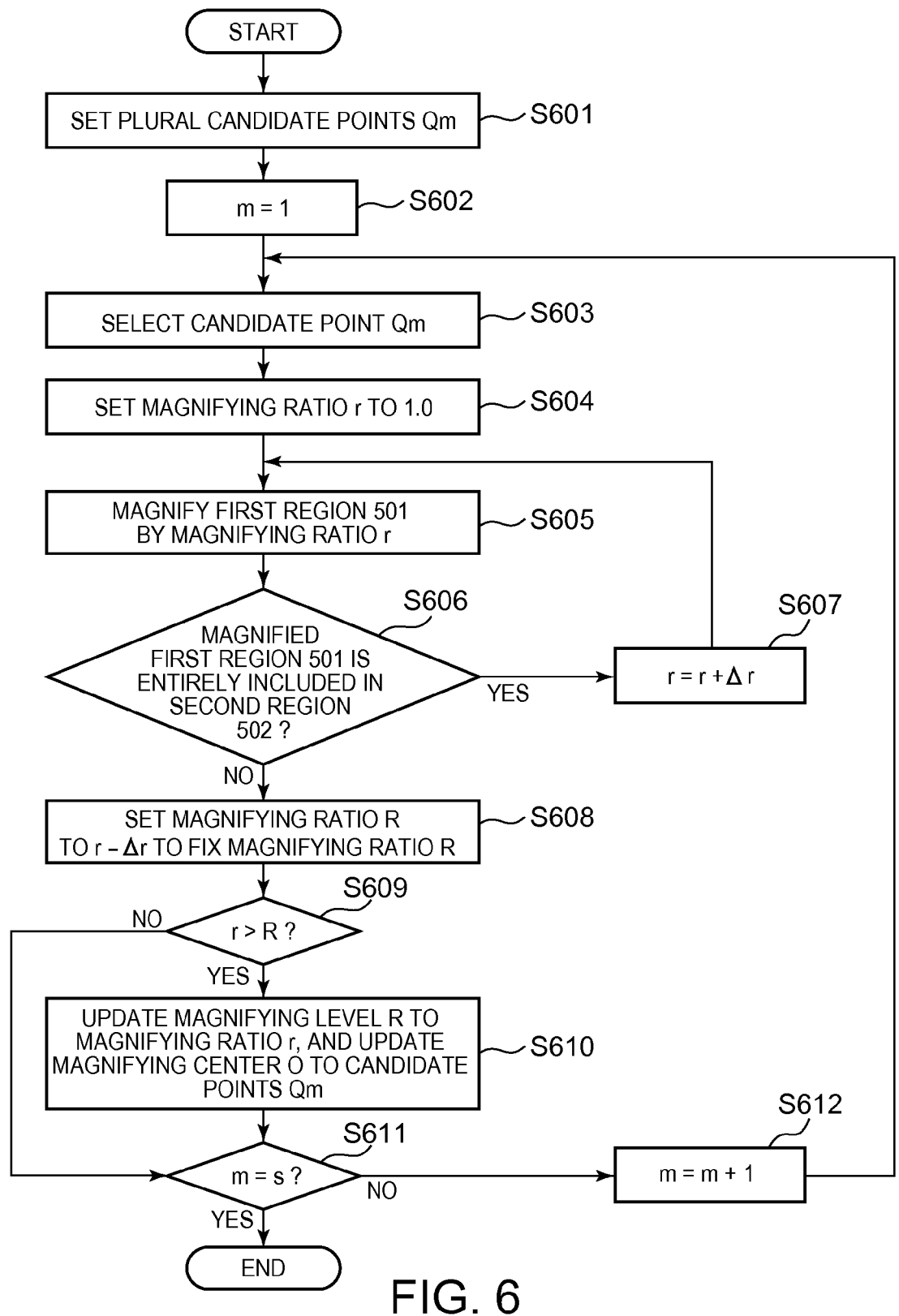
FIG. 6 is a flowchart illustrating processing of a deformation information calculating unit 14.
Figure 7:
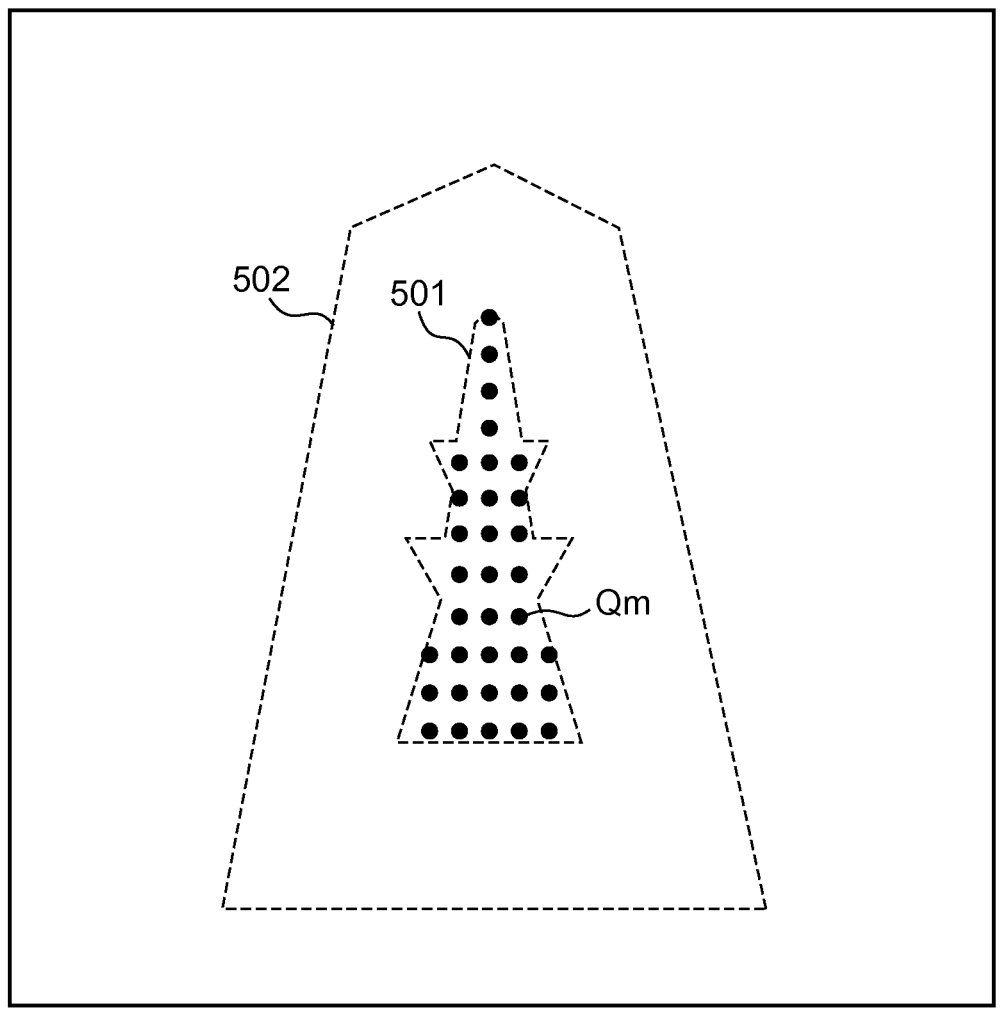
FIG. 7 is a view illustrating an example of a candidate point Pn.

FIG. 6 is a flowchart illustrating processing of the deformation information calculating unit 14. The deformation information calculating unit 14 sets plural candidate points Qm (m=1 to s) (s is the number of candidate points) that are candidates of the magnifying center in the first region 501 (S601). FIG. 7 is a view illustrating an example of the candidate point Qm. For example, the deformation information calculating unit 14 may obtain the barycenter of the first region 501 in the first region 501 to set the lattice-shaped candidate points Qm at predetermined intervals from the barycenter.

The deformation information calculating unit 14 sets m to 1 (S602) and selects the candidate point Qm as the magnifying center O (S603). The deformation information calculating unit 14 sets a magnifying ratio r of the first region 501 to an initial value r=1.0 (S604). The deformation information calculating unit 14 magnifies the first region 501 by the magnifying ratio r having the candidate point Qm as the magnifying center O (S605) Specifically, a vertex V of the mesh is moved to a point V' (OV'=r×OV) at which a half line OV connecting the magnifying center O and a vertex V of the mesh in the first region 501 is r times The processing in Step S605 is performed to all the vertexes of the mesh in the first region 501, thereby magnifying the first region 501.

The deformation information calculating unit 14 determines whether the magnified first region 501 is included in the second region 502 (S606). When the magnified first region 501 is included in the second region 502 ("YES" in Step S606), the deformation information calculating unit 14 sets a value, in which a predetermined constant Δr (for example, Δr=0.1) is added to the magnifying ratio r (i.e. the value is represented by r+Δr), to the new magnifying ratio r (S607), and the flow goes to Step S605.

When the magnified first region 501 is not included in the second region 502 ("NO" in Step S606), the deformation information calculating unit 14 fixes the magnifying ratio R. For example, the deformation information calculating unit 14 may fix R=r−Δr as the magnifying ratio R.

The deformation information calculating unit 14 determines whether the magnifying ratio r is larger than the magnifying ratio R before update (to be described later) (S609). When the magnifying ratio r is not larger than the magnifying ratio before update ("NO" in Step S609), the deformation information calculating unit 14 determines whether m is equal to s (S611). That is, the deformation information calculating unit 14 determines whether all the candidate points Qm are selected. When m is not equal to s ("NO" in Step S611), a value (m+1) in which 1 is added to m is set to the new m, and the flow goes to Step S603.

When the magnifying ratio r is larger than the magnifying ratio R of pre-update ("YES" in Step S609), the deformation information calculating unit 14 sets the magnifying ratio r to the new magnifying ratio R, and writes the magnifying ratio r in the storage unit 30 to update the magnifying ratio R. The deformation information calculating unit 14 writes the candidate point Om at that time as the magnifying center O in the storage unit 30 to update the magnifying center O (9610). The flow goes to Step S611.

When m is equal to s ("YES" in Step S611), the deformation information calculating unit 14 notifies the image deformation unit 15 of the magnifying ratio R and the magnifying center O, and the processing is ended.

Alternatively, unlike the example in the flowchart in FIG. 6, the deformation information calculating unit 14 may calculate the magnifying ratio r in each candidate point Qm to store the magnifying ratio r in the storage unit 30. At this point, the deformation information calculating unit 14 may fix the magnifying ratio r having the maximum size as the magnifying ratio R to set the candidate point Qm having the magnifying ratio r to the magnifying center O.

The image deformation unit 15 magnifies the first region 501 while deforming the second region 502 based on the magnifying ratio R and the magnifying center O. That is, the image deformation unit 15 moves the vertexes of the first region 501 and second region 502 in the vertexes of the mesh in the input image 50 based on the magnifying ratio R and the magnifying center O, thereby producing the thumbnail image 60 in which the input image 50 is processed.

Figure 8:
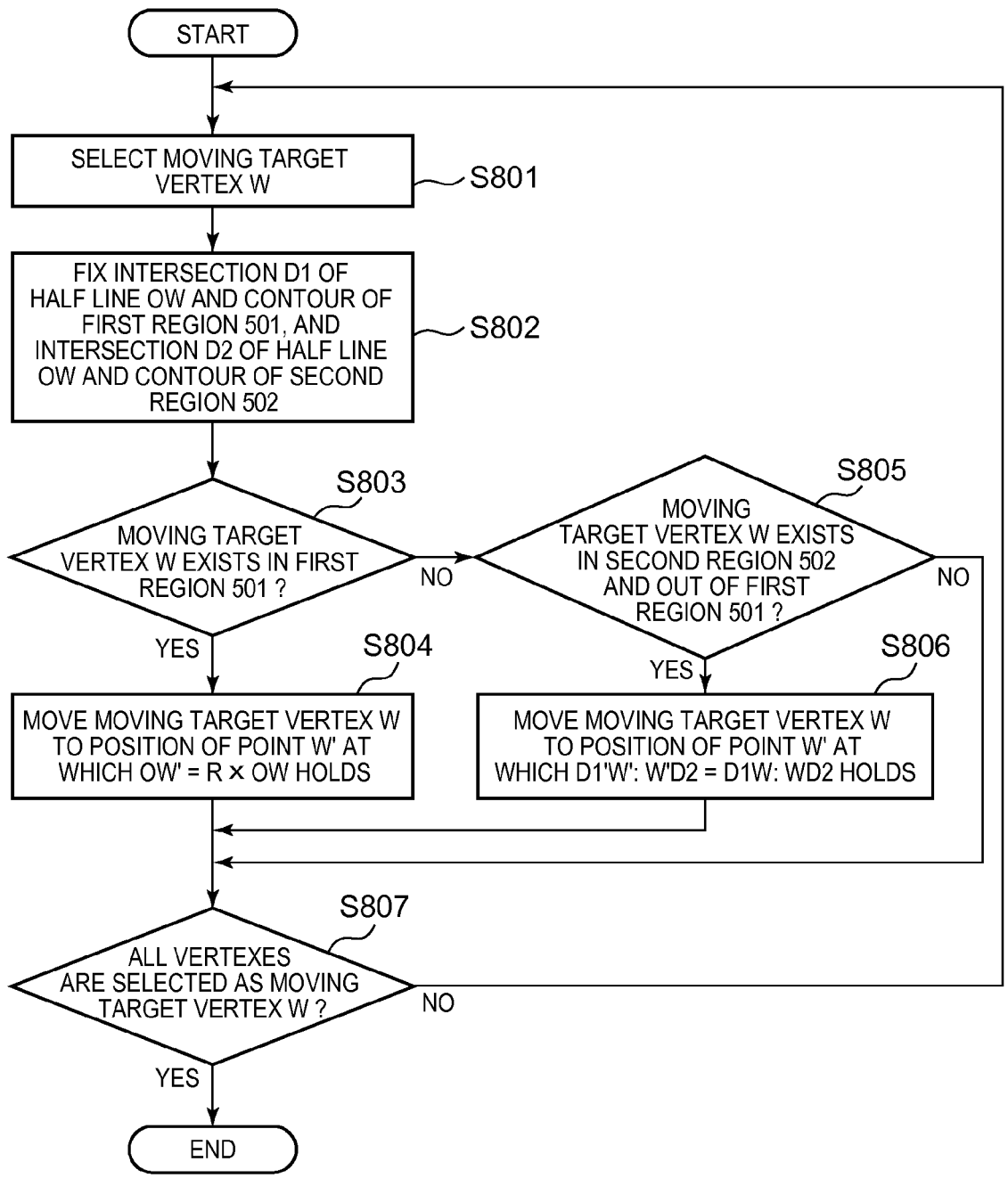
FIG. 8 is a flowchart illustrating processing of an image deformation unit 15.

FIG. 8 is a flowchart illustrating processing of the image deformation unit 15. The flowchart of FIG. 8 is started when the image deformation unit 15 reads the input image 50 from the storage unit 30. The image deformation unit 15 selects one vertex, which is not moved yet, in the vertexes of the mesh in the input image 50 as a vertex (moving target vertex W) of the processing target (S801).

Figure 9:
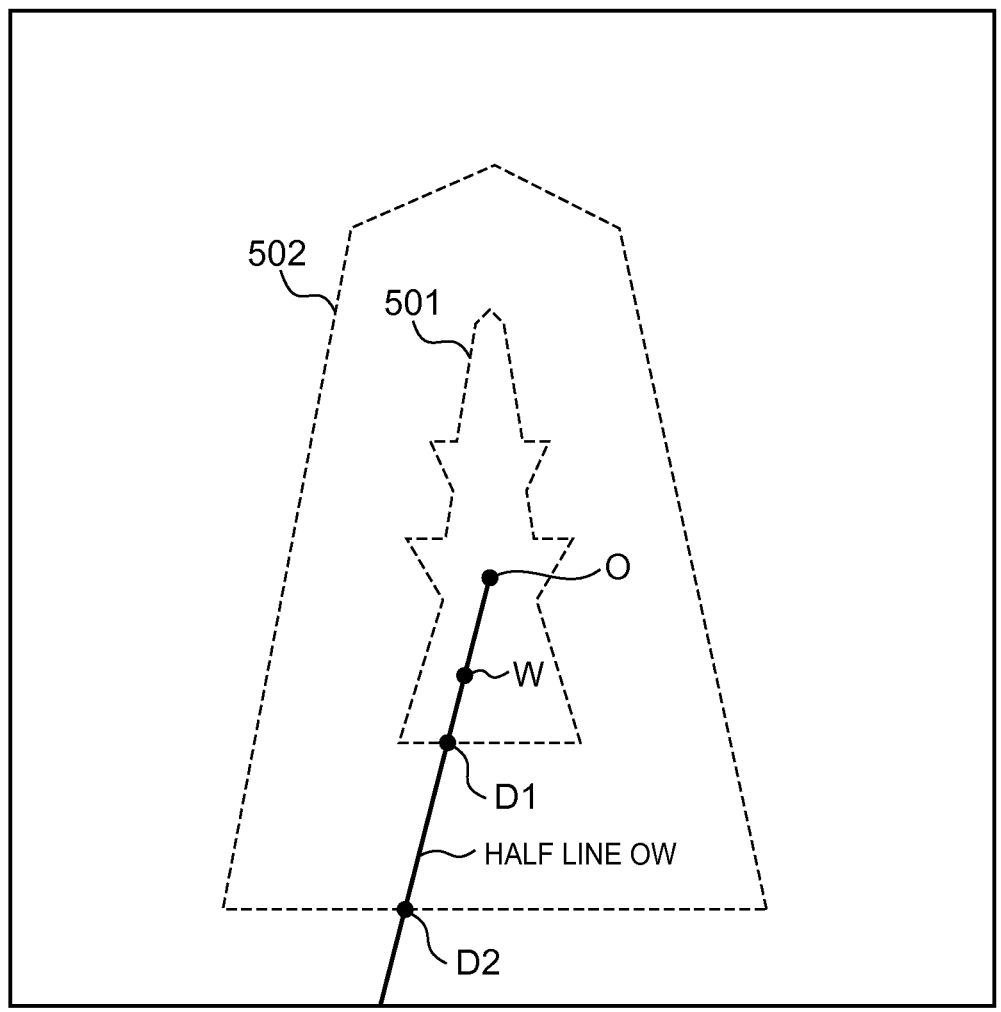
FIG. 9 is a conceptual view illustrating a half line OW and an intersection D1 and the half line OW and an intersection D2.

The image deformation unit 15 draws a half line OW from the magnifying center O to the moving target vertex W to fix an intersection D1 of the half line OW and the contour of the first region 501 and an intersection D2 of the half line OW and the contour of the second region 502 (S802). FIG. 9 is a conceptual view illustrating the half line OW and the intersection D1, and the half line OW and the intersection D2. FIG. 9 illustrates a relationship between the half line OW and the intersection D1 and the relationship between the half line OW and the intersection D2.

The image deformation unit 15 determines whether the selected moving target vertex W exists in the first region 501 (S803). When the selected moving target vertex W exists in the first region 501 ("YES" in Step S803), the image deformation unit 15 moves the selected moving target vertex W to a position of a point W' at which "OW' (vector)=magnifying ratio R×OW (vector)" holds (S804). The image deformation unit 15 determines whether all the vertexes in the meshes in the input image 50 are selected (S807). For example, the image deformation unit 15 may make the determination in Step S807 by storing the vertex ID of the vertex selected as the moving target vertex W in the storage unit 30.

When all the vertexes in the meshes in the input image 50 are selected ("YES" in Step S807), the image deformation unit 15 notifies the presenting unit 16 that the image deformation is ended, and the processing is ended. When all the vertexes in the meshes in the input image 50 are not selected ("NO" in Step S807), the flow returns to Step S801.

When the selected moving target vertex W does not exist in the first region 501 ("NO" in Step S803), the image deformation unit 15 determines whether the selected moving target vertex W exists in the second region 502 and out of the first region 501 (S805). When the selected moving target vertex W does not exist in the second region 502 and out of the first region 501 ("NO" in Step S805), the flow goes to Step S807. When the selected moving target vertex W exists in the second region 502 and out of the first region 501 ("YES" in Step S805), the image deformation unit 15 moves the moving target vertex W to a position of a point W' at which "D1'W': W'D2=D1W:WD2" holds (S806). At this point, D1' is an intersection of the half line OW' and the contour of the first region 501 magnified by the magnifying ratio R. Then the flow goes to Step S807. The input image 50 becomes the thumbnail image 60 through the processing illustrated by the flowchart of FIG. 8.

The presenting unit 16 presents the thumbnail image 60. For example, the presenting unit 16 may be a display in which the thumbnail image 60 is rendered and displayed. In such cases, the presenting unit 16 may interpolate the patch to render the thumbnail image 60 using color information possessed by each vertex of the mesh (see "Resolution Conversion Using Delaunay Triangulaton" by T. Nakamura, H. Abe, K. Nishio, and K. Kobori, Journal of the Institute of Image Electronics Engineers of Japan, Vol. 35, No. 5, 2005). Contents of which are hereby incorporated by reference.

(Modification)

In the first embodiment, the input image 50 is expressed by the meshes. Alternatively, the input image 50 may be expressed by a pixel image. In such cases, the first region calculating unit 12, the second region calculating unit 13, and the deformation information calculating unit 14 may perform similar pieces of processing while the vertex of the mesh is set to the center point of each pixel.

The image deformation unit 15 rewrites the luminance and color information of each pixel, which are stored in the storage unit 30, to perform image deformation. That is, the image deformation unit 15 tentatively calculatesa moving destination of a central point of each pixel similarly to the method for fixing the moving destination of the vertex of the mesh. A reference point is formed by adding the luminance and color information of each pixel to the coordinate calculated as the moving destination of the central point of the pixel. The luminance and color information of each pixel is rewritten by interpolating the reference point, thereby producing the image of post-deformation.

(Second Embodiment)

Figure 10:
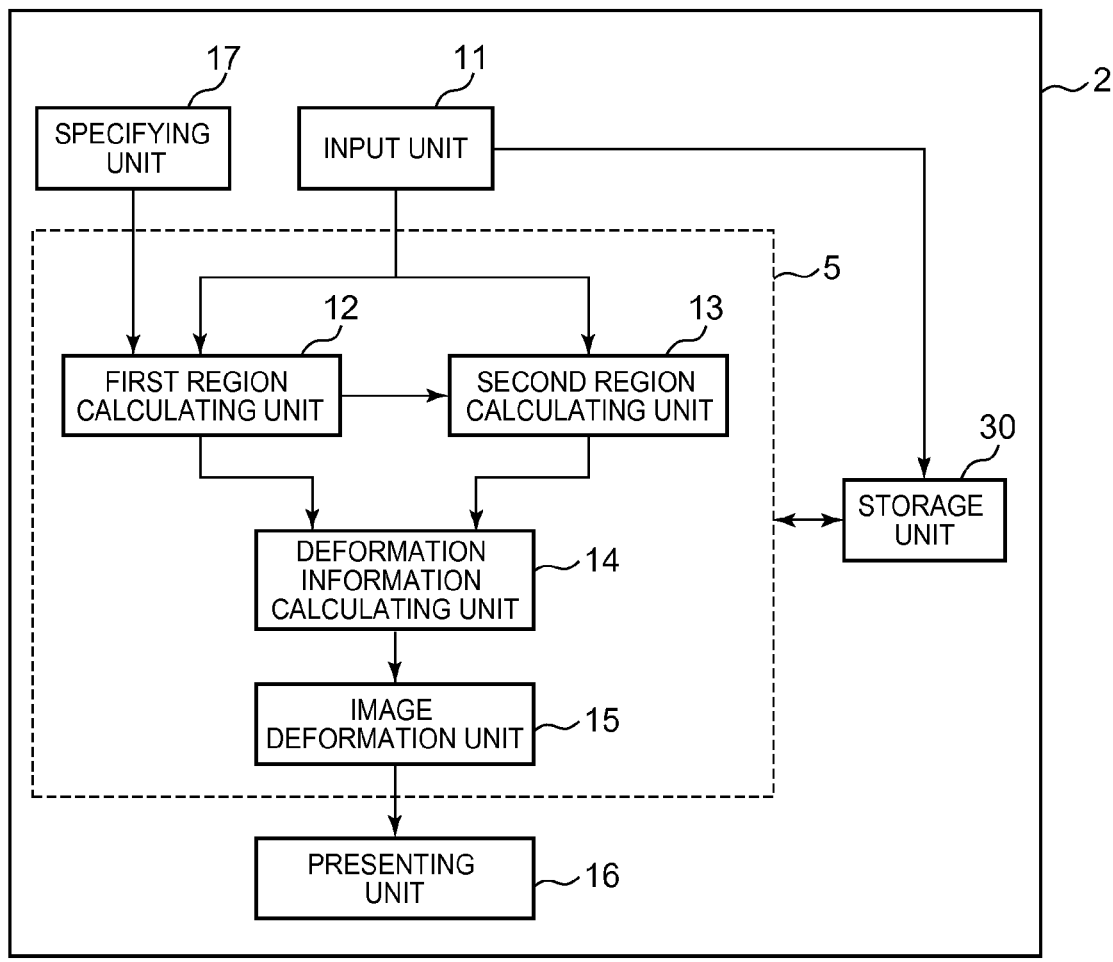
FIG. 10 is a block diagram illustrating a configuration of an image processing apparatus 2 according to a second embodiment of the invention.

In an image processing apparatus 2 according to a second embodiment of the invention, the first region 501 is specified by the user. FIG. 10 is a block diagram illustrating a configuration of the image processing apparatus 2 of the second embodiment. When compared with the image processing apparatus 1, the image processing apparatus 10 further includes specifying unit 17. The specifying unit 17 specifies the first region 501 by an operation of the user. For example, the specifying unit 17 may be a mouse, a keyboard, a touch pen, and the like.

According to the embodiments described above, the image processing apparatus, method, and program, which can produce the thumbnail image whose contents are easily recognized by the user, can be provided.

In this embodiment, the image processing apparatus calculates the second region that surrounds the first region. Additionally, the second region may partially surround the first region, in another words it may be overlapped each other. In addition, a plurality of the first region may exist in the image and a single second region may surround a plurality of the first region.

Additionally, in this embodiment, the rest region which does not include the first region and the second region is not deformed. However, the rest region except the first region and the second region may be deformed unless its deformation is not identically as the first region or the second region. Also it may be changed according to a different algorithm which is not as same as the first region or the second region.

Furthermore, the first region on which a user easily focuses on an input image may have an attribution, for example, such as people, an animal, a plant or a past history. Based on the attribution, the first region may be determined Although the embodiments of the present invention are described by way of example, the invention is not limited to the embodiments. The new embodiments can be implemented in various others forms, and various omissions, replacements, and changes can be made without departing from the scope of the invention. The embodiments and the modifications thereof are included in the scope of the invention and the scope of equivalent to the invention described in the claims.

What is claimed is:

1. An image processing apparatus comprising:
an input unit which inputs an image;
a first region calculating unit which calculates a first region in the image;
a second region calculating unit which calculates second region which surrounds the first region in the image;
a deformation information calculating unit which calculates a magnifying ratio of the first region, the magnifying ratio being a magnification at which an image included in the first region is magnified; and
an image deformation unit which magnifies the first region based on the magnifying ratio while reducing the second region;
wherein the deformation information calculating unit determines whether a magnified first region is included in the second region, and corrects the magnifying ratio when the magnified first region is not included in the second region; and
wherein a third region in the image, which surrounds the second region and is a remaining region of the image other than the first region and the second region, is not deformed in a substantially same manner as the first region or the second region by said image deformation unit.

2. The apparatus according to claim 1, wherein the second region calculated by said second region calculating unit is smaller than the image input by said input unit.

3. The apparatus according to claim 1, wherein:
the deformation information calculating unit calculates a magnifying center and the magnifying ratio in the first region, based on a shape and a size of the first region and a shape and a size of the second region,
the magnifying center is a center in magnifying the image included in the first region, and
based on the magnifying center and the magnifying ratio, said image deformation unit magnifies the image included in the first region while reducing an image included in the second region.

4. The apparatus according to claim 3, wherein the first region calculating unit calculates the first region in the image based on a degree of attention expressing a degree of intensity of a change in luminance of the image, and the second region calculating unit calculates the second region according to the change in luminance of the image.

5. The apparatus according to claim 3, wherein:
the image is expressed by a mesh in a coordinate space defined by a position and luminance, the mesh being a set of patches that is of a geometrical plane;
said second region calculating unit calculates the second region according to a change of an undulation of the patches in the mesh;
said image deformation unit moves a vertex of the mesh in the first region to a position where a distance from the magnifying center to the vertex is magnified by the magnifying ratio; and
the image deformation unit magnifies the image included in the first region while reducing the image included in the second region.

6. The apparatus according to claim 3, wherein:
the image is a pixel image which is expressed by a position and luminance;
said image deformation unit determines a luminance of a pixel in the first region based on the luminance of the pixel of pre-magnification and a luminance of a pixel adjacent to the pixel, the pixel being located at a position where a distance from the magnifying center to a center of the pixel is magnified by the magnifying ratio; and
said image deformation unit magnifies the image included in the first region while reducing the image included in the second region.

7. The apparatus according to claim 3, wherein the deformation information calculating unit sets a plurality of candidate points of the magnifying center in the first region, and selects one of the candidate points so that the first region is magnified as a larger size in the second region.

8. An image processing method comprising:
inputting an image by an input unit;
calculating a first region in the image by a first region calculating unit;
calculating a second region which surrounds the first region in the image by a second region calculating unit;

calculating a magnifying ratio of the first region by a deformation information calculating unit, the magnifying ratio being a magnification at which an image included in the first region is magnified; and magnifying the first region based on the magnifying ratio while reducing the second region by an image deformation unit;

wherein said calculating by the deformation information calculating unit further includes determining whether a magnified first region is included in the second region, and correcting the magnifying ratio when the magnified first region is not included in the second region; and wherein a third region in the image, which surrounds the second region and is a remaining region of the image other than the first region and the second region, is not deformed in a substantially same manner as the first region or the second region in said magnifying by said image deformation unit.

9. The method according to claim 8, wherein the second region calculated by the second region calculating unit is smaller than the image input by the input unit.

10. The method according to claim 8, wherein:
said calculating by the deformation information calculating unit further includes calculating a magnifying center and the magnifying ratio in the first region, based on a shape and a size of the first region and a shape and a size of the second region,
the magnifying center is a center in magnifying the image included in the first region, and
based on the magnifying center and the magnifying ratio, the image included in the first region is magnified while an image included in the second region is reduced.

11. The method according to claim 10, wherein the first region in the image is calculated by the first region calculating unit based on a degree of attention expressing a degree of intensity of a change in luminance of the image, and the second region is calculated by the second region calculating unit according to the change in luminance of the image.

12. The method according to claim 10, wherein:
the image is expressed by a mesh in a coordinate space defined by a position and luminance, the mesh being a set of patches that is of a geometrical plane;
said calculating by the second region calculating unit further includes calculating the second region according to a change of an undulation of the patches in the mesh;
the image deformation unit moves a vertex of the mesh in the first region to a position where a distance from the magnifying center to the vertex is magnified by the magnifying ratio; and
the image deformation unit magnifies the image included in the first region while reducing the image included in the second region.

13. The method according to claim 10, wherein:
the image is a pixel image which is expressed by a position and luminance;
the image deformation unit determines a luminance of a pixel in the first region based on the luminance of the pixel of pre-magnification and a luminance of a pixel adjacent to the pixel, the pixel being located at a position where a distance from the magnifying center to a center of the pixel is magnified by the magnifying ratio; and
said image deformation unit magnifies the image included in the first region while reducing the image included in the second region.

14. The method according to claim 10, wherein said calculating by the deformation information calculating unit further includes setting a plurality of candidate points of the magnifying center in the first region, and selecting one of the candidate points so that the first region is magnified as a larger size in the second region.

15. A non-transitory computer-readable medium on which is stored a computer program for encoding data, the computer program comprising instructions to cause a computing device to perform functions comprising:
inputting an image by an input unit;
calculating a first region in the image by a first region calculating unit;
calculating a second region which surrounds the first region in the image by a second region calculating unit;
calculating a magnifying ratio of the first region by a deformation information calculating unit, the magnifying ratio being a magnification at which an image included in the first region is magnified; and
magnifying the first region based on the magnifying ratio while reducing the second region by an image deformation unit;
wherein said calculating by the deformation information calculating unit further includes determining whether a magnified first region is included in the second region, and correcting the magnifying ratio when the magnified first region is not included in the second region; and
wherein a third region in the image, which surrounds the second region and is a remaining region of the image other than the first region and the second region, is not deformed in a substantially same manner as the first region or the second region in said magnifying by said image deformation unit.

16. The non-transitory computer-readable medium according to claim 15, wherein the second region calculated by said second region calculating unit is smaller than the image input by said inputting.

17. The non-transitory computer-readable medium according to claim 15, wherein:
said calculating by the deformation information calculating unit further includes calculating a magnifying center and the magnifying ratio in the first region, based on a shape and a size of the first region and a shape and a size of the second region,
the magnifying center is a center in magnifying the image included in the first region, and
based on the magnifying center and the magnifying ratio, the image included in the first region is magnified while an image included in the second region is reduced.

18. The non-transitory computer-readable medium according to claim 17, wherein:
said first region calculating unit calculates the first region in the image based on a degree of attention expressing a degree of intensity of a change in luminance of the image; and
said second region calculating unit calculates the second region according to the change in luminance of the image.

19. The non-transitory computer-readable medium according to claim 17, wherein said calculating by the deformation information calculating unit further includes setting a plurality of candidate points of the magnifying center in the first region, and selecting one of the candidate points so that the first region is magnified as a larger size in the second region.

* * * * *